Sept. 4, 1951     M. F. PETERS     2,566,367
TEST CIRCUIT FOR TEMPERATURE RESPONSIVE SYSTEMS
Filed Aug. 16, 1949
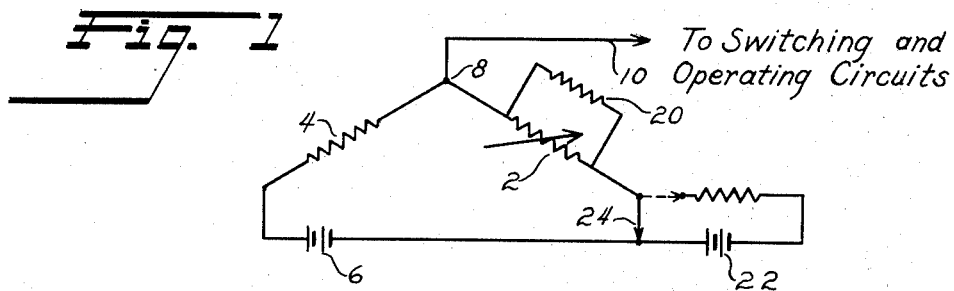
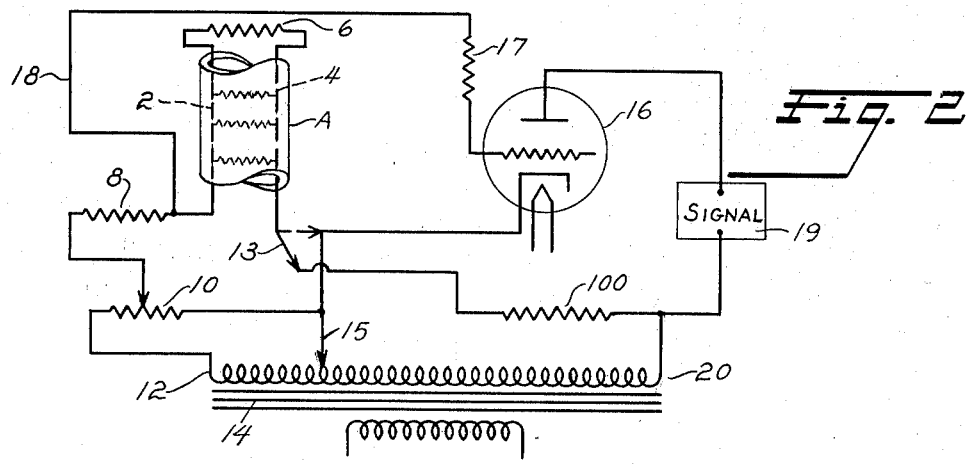
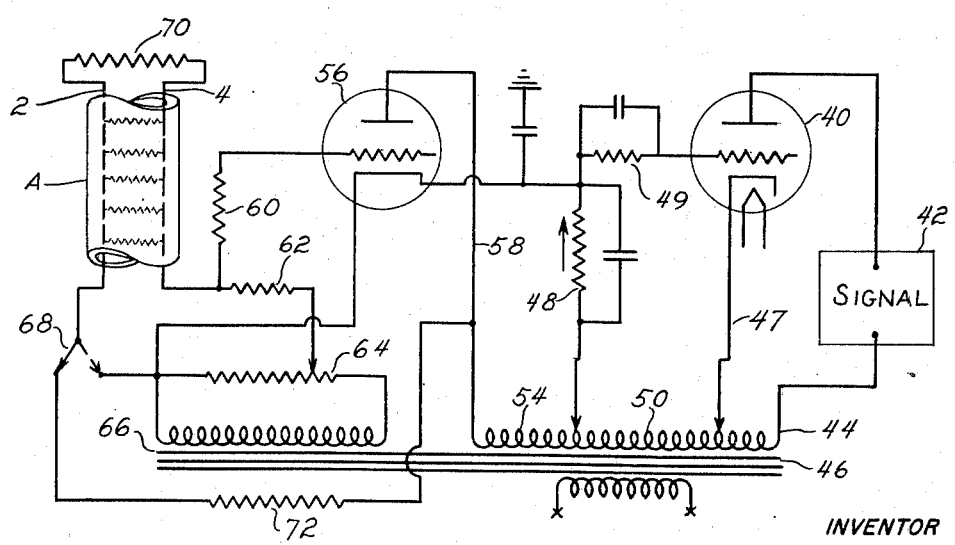
INVENTOR
MELVILLE F. PETERS
By Scrivener & Parker
Attorneys Patented Sept. 4, 1951

2,566,367

UNITED STATES PATENT OFFICE 2,566,367

TEST CIRCUIT FOR TEMPERATURE RESPONSIVE SYSTEMS

Melville F. Peters, East Orange, N. J., assignor to Petcar Research Corporation, Newark, N. J., a corporation of New Jersey Application August 16, 1949, Serial No. 110,648

2 Claims. (Cl. 177—311)

This application is a continuation-in-part of my co-pending application Serial No. 105,423, filed July 18, 1949, for Temperature-Responsive System, which is now abandoned, and the invention described and claimed in this application forms a part of, or is auxiliary to, the system of the parent application.

The system described and claimed in the parent application is one which is adapted and intended to cause some operation, such as the energization of a signal, on an increase to some predetermined value in the ambient temperature within a monitored space within which the temperature-responsive part of the system or device is located. Such devices and systems are useful to indicate the existence of a predetermined temperature or to provide control operations at a predetermined temperature and for many other similar purposes. In this and the parent applications, and by way of illustration only, the invention is described as a "fire detector," by which is meant a device or system for indicating combustion at a predetermined temperature occurring within a space which is being monitored.

The invention described and claimed in this application provides means for testing all parts of the system described and claimed in the parent application and, further, forms part of the main detector system, whereby the pilot (if the system is carried by an aircraft) or other operator may determine instantaneously and without connection or disconnection of parts whether the detector system is operative to provide its intended function.

In the drawings forming part of this application,

Fig. 1 is a schematic circuit diagram illustrating the operation of my invention;

Fig. 2 is a circuit diagram of a fire detector system including testing means according to the invention; and Fig. 3 is a circuit diagram of a preferred fire detector system including testing means according to the invention.

In fire detector systems according to the invention described and claimed in my aforesaid co-pending application, use is made of a detector element comprising two electrical conductors spaced apart by material having a very high resistance at normal temperatures and a relatively lower resistance at a higher temperature, whereby an electric circuit may be completed between the two conductors on increase of the ambient temperature to a predetermined value, which energized circuit may be used for any desired purpose. In detector systems according to my invention the variable change in resistance of the detector element, which is indicated at 2 in Fig. 1, is connected in series with a fixed resistor 4 having approximately the resistance of the detector element at its operating temperature. These two resistances are connected as a bridge across a suitable source of voltage 6 and their point of connection 8, i. e. the midpoint of the bridge, is connected through the lead 10 to a switching circuit which controls an indicator or control means and, for example, may be connected to the control grid of vacuum tube used as a switching means. In the operation of such a system the normally infinite resistance of the detector element causes the voltage supplied to the switching circuit, e. g. to the grid of the tube described above, to be insufficient to operate the switching means, for example to trigger the tube. Reduction of the resistance of the detector element to approximately that of the fixed resistor causes the voltage supplied through lead 10 to the switching circuit to reach a value sufficient to the switching circuit.

By this invention I provide means to energize the entire circuit of such a system in order to indicate that all of its parts and elements are operable. Such means are schematically shown in Fig. 1 and comprise a test resistor 20 connected in shunt with the variable resistance 2 of the detector element, a supplemental source of voltage 22 and a manual switch 24 operable to connect the supplemental voltage source in series with the usual voltage source 6 in order to increase the voltage applied across the resistor bridge. The resistance of the test resistor 20 with the two voltage sources 6 and 22 connected across the bridge bears the same relation to the resistance of fixed resistor 4 that the resistance of variable resistor 2 at its operating temperature bears to that of the fixed resistance 4 with only the usual source 6 connected across the bridge. Thus, when the two sources of voltage are connected across the bridge by operation of the manual switch, it being assumed that this is done at normal temperatures at which the resistance of the detector element 2 is substantially infinite, the relation between the voltage drop across resistors 4 and 20 will be such that voltage supplied to the switching circuit through lead 10 will be just sufficient to operate the switching circuit to energize the indicating or control means. Thus, operation of the manual switch 24 will operate the entire system and effect operation of the signal or control means, indicating that the entire system is operative.

In Fig. 2 of the drawings there is disclosed a fire detector system including means for causing a detector element to control a signal circuit, and also including test means in accordance with this invention, which fire detector system and test means is operative in the manner illustrated by the circuit of Fig. 1. This detector system comprises a detector element A which comprises two continuous, electrical conductors 2, 4 which are spaced apart and maintained in position by a material which decreases in electrical resistance with increase in temperature, having substantially infinite resistance at normal room temperature and a low order of resistance at temperatures such as those of combustion of predetermined materials. The fire detector element A may be led through any space or area which is to be monitored for fire. At their one ends the conductors 2, 4 are connected by a resistor 6 which is provided for test purposes as will be described hereinafter. At its other end, one of the conductors, e. g. 2, is connected through resistance 8 and a movable tap to resistance 10 which is connected in shunt with one secondary 12 of a transformer 14, the other terminal of the secondary 12 being connected through lead 15 and switch 13 to the second conductor 4 of the detector element and to the cathode of a thyrathron 16. The grid of the thyratron is connected through current limiting resistor 17 and lead 18 to the connection between resistor 8 and conductor 2 of the fire detector element. The plate of the thyratron is connected to one terminal of a signal device 19, the other terminal of which is connected to one terminal of a second secondary 20 of transformer 14, the other terminal of which is connected through lead 15 to the conductor 4 of the fire detector element and to the cathode of the tube 16. The voltage developed in secondary 12 of transformer 14 must be 180° out of phase with that developed in secondary 20 in order to achieve the proper phase relationship between the voltage supplied to the grid and the voltage supplied to the plate of the thyratron and this phase relationship in the two secondaries is achieved by connecting the proper terminal of each secondary to common lead 15. The magnitude of the grid voltage must be sufficient to quench the thyratron for any given voltage being applied to the plate. The magnitude of resistance 8 may be made equal, or approximately equal, to that of the detector element at the temperature at which the detector is designed to operate. For example, if the detector element is to cause operation of signal 19 at 600° F., the resistance of the detector element at that temperature may be made approximately equal to the resistance of resistor 8. By this means and others, the maximum sensitivity of the system is achieved.

In the operation of the system, voltages are induced in the secondaries 12 and 20 of the transformer 14 which will always be 180° out of phase with respect to the common connection 15 to the cathode of the thyratron and the conductor 4. The resistor 8 and the resistance of the detector element A form a bridge across variable resistor 10 which is, in effect, a source of voltage. At normal temperatures the resistance of the detector element will be substantially infinite and voltage across the resistor 10 will be applied through resistor 8 to the grid of the thyratron, preventing passage of current from the cathode to the plate of that tube. At a predetermined temperature the resistance of detector element A will substantially balance that of resistor 8 and cause the voltage supplied to the grid of the thyratron to decrease, permitting passage of current in the plate circuit, thus operating the signal 19.

It may be desirable to increase the sensitivity of the system disclosed in Fig. 2 and to make it possible to obtain a very close differential between on and off temperatures, and a circuit operable to achieve these desired ends is disclosed in Fig. 3. In this system the plate circuit of the thyratron 40 is connected through signal 42 to one terminal of secondary 44 of transformer 46, the other terminal of this secondary being connected to the cathode of tube 40 through lead 47. The grid of tube 40 is connected through resistors 49 and 48 to one terminal of a secondary 50 of the transformer 46, the other terminal of which is connected to the cathode of tube 40 through lead 47. A third secondary 54 of transformer 46 is connected through resistor 48 to the cathode of a second tube 56, the plate of which is connected through lead 58 to the second terminal of secondary 54. The grid of tube 56 is connected through resistor 60 to conductor 4 of the detector element A and through resistor 62 to the movable tap of resistor 64 which is connected in shunt with a fourth secondary 66 of transformer 46. The second conductor 2 of detector element A is connected through movable switch arm 68 to the common connection between resistor 64 and secondary 66. A test resistor 70 is connected across the free ends of conductors 2, 4 of the detector element. The test switch 68 is movable from a position in which it contacts the common connection between resistor 64 and secondary 66 to a second position in which it connects conductor 2 through resistor 72 to the plate circuit of tube 56.

In the operation of the system disclosed in Fig. 3, assuming the test switch to be in the position in which the operating circuit, rather than the test circuit is employed, as shown in Fig. 3, voltage developed in the secondary 54 of transformer 4 will cause electrons or true current to flow through resistor 48 in the direction of the arrow in Fig. 3, between the cathode and plate of tube 56 and to the second terminal of secondary 54 and this current will be controlled by the instantaneous value of voltage supplied to the grid of tube 56. The resistance of detector element A and of resistor 62 form a bridge across the variable resistance 64. At normal temperatures the substantially infinite resistance of detector element A causes a voltage 180° out of phase with the voltage applied between cathode and plate to appear in the grid of tube 56 which prevents the passage of current between the cathode and the plate of the tube. So long as there is no current in the plate circuit of tube 56, because of the described operation, there will be no voltage drop across the resistor 48, the thyratron 40 will not fire and no current will flow through the signal device 42. At some predetermined temperature the resistance of detector element A will be substantially equal to that of resistor 62, thereby reducing voltage in the grid of tube 56. This will cause current flow in the plate circuit of tube 56, causing current to flow in resistor 48, thereby developing voltage of proper polarity across resistor 48 sufficient to trigger the thyratron 40. When the tube fires, current will flow in its plate circuit through signal device 42 causing the operation of the signal device. Sufficient voltage must be maintained on winding 50 to prevent conduction of thyratron 40 at all times so that thyratron 40 can only be fired by the voltage developed across resistor 48. The phase of the voltage established on winding 50 must be 180° out of phase with that voltage established on winding 44 with respect to the cathode connection 47. These two windings are connected to the cathode of tube 40 by conductor 47 and the required phase relationship is established with reference to this cathode.

Means are provided by the invention for testing the circuit. In the circuit of Fig. 2 such means comprise the resistor 6, which connects the free ends of the conductors 2, 4 of the detector element, and the switch 13 which is operable to connect conductor 4 to the cathode of tube 16, as described, or through resistor 100 to the connection between signal device 19 and secondary 20. In the circuit of Fig. 3 the test means comprise the resistor 70 which connects the free ends of conductors 2, 4 of the detector element, and the switch 68 which is operable to connect conductor 2 to the connection between resistor 64 and secondary 66, or through resistor 72 to the plate circuit of tube 56.

In the operation of the testing means of the circuit of Fig. 2 the switch 13 is operated to connect conductor 4 of the detector element through resistor 100 to the connection between signal 19 and secondary 20, causing resistors 6 and 100 to be connected in series, thus causing just sufficient increase in voltage across the bridge comprising resistor 8 and resistors 6, 100 to operate tube 16 and the alarm 19, thereby indicating the continuity and operativeness of conductors 2, 4. The operation of the testing means of the circuit of Fig. 3 is substantially the same. In this, the switch 68 is operated to connect resistor 70, conductors 2, 4 and resistor 72 in series with resistor 62, thereby operating tube 56 and signal 42 provided all parts are in operative condition. In both circuits the added resistance (100, 72) is just sufficiently low enough to increase the basic voltage ratio $ad/bc$ (see Fig. 1) across the bridge and operate the control tube.

While I have described and illustrated certain forms of the invention, it will be apparent to those skilled in the art that other forms, as well as modifications thereof, may be made without departing in any way from the spirit or scope of the invention for the limits of which reference must be made to the appended claims.

What is claimed is:

1. Testing means for an electrical system comprising a source of voltage, a variable resistor having substantially infinite resistance at normal temperatures and a finite resistance at a higher temperature and a fixed resistance connected in series with the variable resistance and both connected as a bridge across said source of voltage, an operating circuit, and means operable upon reduction of the resistance of the variable resistance to a value having a known relation to the fixed resistance at the voltage of said source to energize said operating circuit, said testing means comprising a fixed test resistance connected in parallel with the variable resistance, and means for disconnecting the parallel-connected resistances from said source of voltage and connecting them and the fixed resistance as a bridge across a second source of voltage of such magnitude that at the voltage of the second source the relation of the parallel-connected test resistance to the fixed resistance is approximately the same as the relation of the variable resistance to the fixed resistance necessary to energize the operating circuit when said resistances are connected across the first source of voltage.

2. Testing means for a system for causing an operation upon the occurrence of a predetermined temperature which system comprises a source of alternating voltage, a detector element comprising two conductors separated by material having substantially infinite resistance at normal temperatures and a finite resistance at a predetermined temperature higher than normal, a fixed resistor which at the voltage of said source has predetermined relation to that of the detector element at said predetermined temperature and connected in series with the resistance of the detector element to form a bridge which is connected across the source of voltage, a circuit including an operating device, a second source of alternating voltage which is 180° out of phase with that of the first source of voltage, and switching means connected to the midpoint of said bridge to be operated to open said circuit when the resistance of the detector element is substantially infinite and to close said circuit when the resistance of the detector element and that of the fixed resistance have said predetermined relation, said testing means comprising a test resistor connecting said conductors and shunting the variable resistance of the detector element, a third source of alternating voltage, and means for connecting said additional source of voltage across the bridge, said additional source being of such magnitude that with the total voltage across the bridge the relation of the test resistance to the fixed resistance is approximately the same as the said predetermined relation of the variable resistor to the fixed resistor at the voltage of the first source and at the operating temperature of the detector element.

MELVILLE F. PETERS.

No references cited.